United States Patent [19]

Morrell et al.

[11] Patent Number: 4,634,247

[45] Date of Patent: Jan. 6, 1987

[54] METHOD FOR SCREENING LINE SCREEN SLIT MASK COLOR PICTURE TUBES

[75] Inventors: Albert M. Morrell, East Hempfield Township, Lancaster County; Walter D. Masterton, Manheim Township, Lancaster County; Richard C. Bauder, Manor Township, Lancaster County, all of Pa.

[73] Assignee: RCA Corporation, Princeton, N.J.

[21] Appl. No.: 811,153

[22] Filed: Dec. 19, 1985

[51] Int. Cl.[4] ........................ G03B 41/00; G03C 5/00

[52] U.S. Cl. ........................................... 354/1; 430/24

[58] Field of Search ........................ 354/1; 430/24, 26

[56] References Cited

U.S. PATENT DOCUMENTS

| | | | |
|---|---|---|---|
| 3,587,417 | 6/1971 | Balder et al. | 354/1 |
| 3,888,673 | 6/1975 | Suzuki et al. | 430/24 |
| 3,889,145 | 6/1975 | Suzuki et al. | 313/408 |
| 3,890,151 | 6/1975 | Suzuki et al. | 430/24 |
| 3,900,854 | 8/1975 | Osakabe et al. | 354/1 |
| 3,925,700 | 12/1975 | Saito | 313/403 |
| 3,947,718 | 3/1976 | Gerardus van Lent | 313/408 |
| 4,049,451 | 9/1977 | Law | 430/24 |
| 4,078,239 | 3/1978 | Prazak et al. | 354/1 |
| 4,111,694 | 9/1978 | Duistermaat et al. | 354/1 |
| 4,256,390 | 3/1981 | Fisher et al. | 354/1 |
| 4,370,036 | 1/1983 | Kelly et al. | 354/1 |
| 4,516,841 | 5/1985 | Ragland, Jr. | 354/1 |
| 4,568,162 | 2/1986 | Ragland | 430/24 |

*Primary Examiner*—A. A. Mathews

*Attorney, Agent, or Firm*—Eugene M. Whitacre; Dennis H. Irlbeck

[57] ABSTRACT

The present invention is an improvement in a method of screening a line screen slit mask color picture tube. Such method includes coating a faceplate panel of the tube with a photosensitive material, inserting a slit shadow mask into the panel and exposing the photosensitive material by passing light from a line light source through the slits of the mask. Such method further comprises positioning a generally cylindrical shaped lens between the line light source and the faceplate panel during exposure of the photosensitive material. The longitudinal axis of the lens is oriented perpendicular to the longitudinal axis of the line light source. The improvement comprises moving both the faceplate panel and the cylindrical shaped lens in synchronization in a direction parallel to the line light source during the exposing step.

1 Claim, 6 Drawing Figures

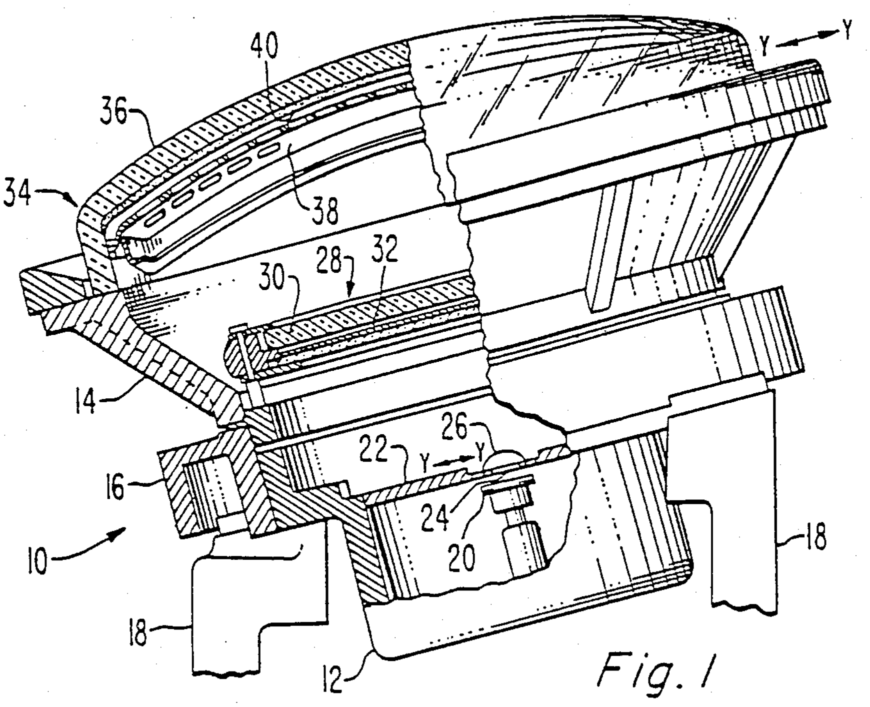
Fig. 1
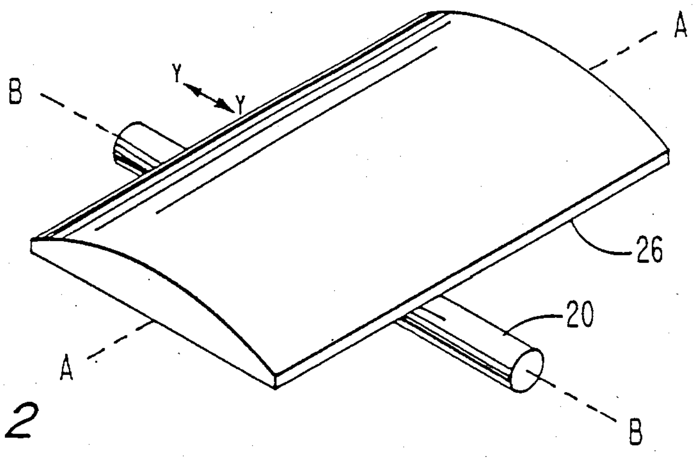
Fig. 2
Fig. 3
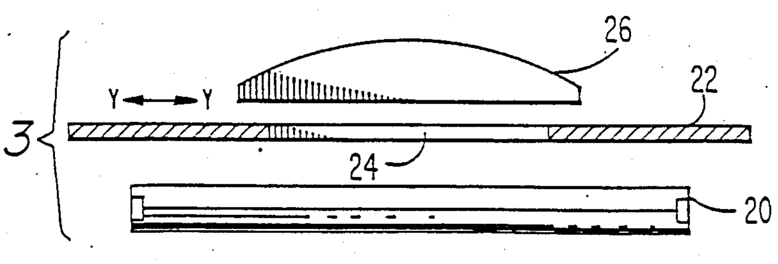

METHOD FOR SCREENING LINE SCREEN SLIT MASK COLOR PICTURE TUBES

This invention relates to a method of screening a color picture tube line screen by a photographic technique that uses a slit shadow mask of the tube as a photomaster, and particularly to an improvement in a method wherein tilting of a line light source image projected through the shadow mask onto the tube faceplate during screening is corrected by use of a correction lens.

BACKGROUND OF THE INVENTION

Most color picture tubes presently being manufactured are of the line screen slit mask type. These tubes have spherically contoured rectangular faceplates with line screens of cathodoluminescent materials thereon and somewhat spherically contoured slit-apertured shadow masks adjacent to the screens. The mask slits are aligned in vertical columns with each column containing a plurality of slits which are vertically separated by bridge or web portions of the mask. The line screens in these tubes include peripheral borders having slightly curved sides and rounded corners.

Such line screen slit mask type tubes are screened by a photographic method that utilizes a line light source, such as disclosed in U.S. Pat. No. 4,049,451 issued to H. B. Law on Sept. 20, 1977. The use of a line light source to form continuous phosphor lines, however, has an inherent problem that must be solved. Because of the substantially spherical curvature of the shadow mask, the slit apertures of the mask, that are off the major and minor axes of the mask, are tilted with respect to the line light source image. If uncorrected, such tilting results in the formation of phosphor lines that are relatively ragged.

Several methods have been suggested to solve the problem caused by this tilting. One of these methods is disclosed in U.S. Pat. No. 3,888,673, issued to Suzuki et al. on June 10, 1975 and in U.S. Pat. No. 3,890,151, issued to Suzuki et al. on June 17, 1975. In the method of these patents, a shield plate is used in conjunction with a tilting or rocking line light source. As the shield plate is moved to expose various parts of the mask and screen, the light source is tilted so that it parallels the slits in the exposed part of the mask. Such method of screening not only requires several movable mechanical parts, but also is very time consuming since each exposed portion of the screen has to be exposed to the light source a sufficient time to sensitize a photosensitive screen layer.

In another method, the off-minor-axis mask aperture columns are bowed so that the apertures are less tilted with respect to a line light source. Patents illustrative of this concept are: U.S. Pat. No. 3,889,145, issued to Suzuki et al. on June 10, 1975; U.S. Pat. No. 3,925,700, issued to Saito on Dec. 9, 1975; and U.S. Pat. No. 3,947,718, issued to vanLent on Mar. 30, 1976.

In yet another method, a negative meniscus lens is located between a line light source and a shadow mask during screening to cause a rotation of the line light source image in a direction to decrease the aforementioned tilting of the slit image. Such method is disclosed in U.S. Pat. No. 4,078,239, issued to Prazak et al. on Mar. 7, 1979. As noted in this patent, the theoretical limit in reduction of tilting using the meniscus lens disclosed therein appears to be in the approximate range of 62% to 70% depending on tube sizes.

Recently, an improved line screen slit mask color picture tube has been suggested which has a more truly rectangular viewing screen than has previously been achieved in such tubes with spherically curved faceplates. It is particularly important in such improved tubes to form straight smooth phosphor lines on the sides of the screen. Therefore, it is not possible to use the aforementioned bowed apertured column concept to correct for aperture image tilting. Furthermore, although use of the aforementioned meniscus lens concept can provide some correction for light source image tilt, the theoretical limit to the amount of tilt correction still leaves something to be desired in achieving smooth phosphor lines at the sides of the screen.

Another solution to the tilting problem is presented in U.S. Pat. No. 4,516,841, issued to Ragland on May 14, 1985. This patent discloses the use of a generally cylindrical shaped lens between a line light source and a faceplate panel during exposure of photosensitive material on the panel. The longitudinal axis of the lens is oriented perpendicular to the longitudinal axis of the line light source. Because of the presence of the lens, the images of the line light source projected through the slits of the mask onto the photosensitive material at locations off the major and minor axes of the panel are rotated toward parallelism with the minor axis thereby resulting in exposure of straight smooth lines on the photosensitive material.

During screening with a line light source, it is common to move or oscillate the faceplate panel at a slow speed in a direction parallel to the line light source and the intended direction of the phosphor lines. This motion or oscillation compensates for the shadowing effect of the webs and provides a more uniform exposure of the lines. Unfortunately, when the cylindrical lens of the Ragland patent is used, this movement of the faceplate causes the projected image of the line light source to move sideways slightly where it lands in the corners of the faceplate. Because of this movement, the phosphor line areas that are exposed are somewhat wider than anticipated. It is therefore desirable to improve upon the method of the Ragland patent to solve this secondary tilting problem caused by movement of the faceplate panel.

SUMMARY OF THE INVENTION

The present invention is an improvement in a method of screening a line screen slit mask color picture tube. Such method includes coating a faceplate panel of the tube with a photosensitive material, inserting a slit shadow mask into the panel and exposing the photosensitive material by passing light from a line light source through the slits of the mask. Such method further comprises positioning a generally cylindrical shaped lens between the line light source and the faceplate panel during exposure of the photosensitive material. The longitudinal axis of the lens is oriented perpendicular to the longitudinal axis of the line light source. The improvement comprises moving both the faceplate panel and the cylindrical shaped lens in synchronization in a direction parallel to the line light source during the exposing step.

BRIEF DESCRIPTION OF THE DRAWINGS

FIG. 1 is a plan view, partly in axial section, of a lighthouse exposure device used for screening color picture tubes.

FIG. 2 is a perspective view of a tilt correction lens and a line light source.

FIG. 3 is a partially sectioned side view of the lens and light source of FIG. 2 with an apertured plate therebetween.

DETAILED DESCRIPTION OF THE PREFERRED EMBODIMENT

Figure 4:
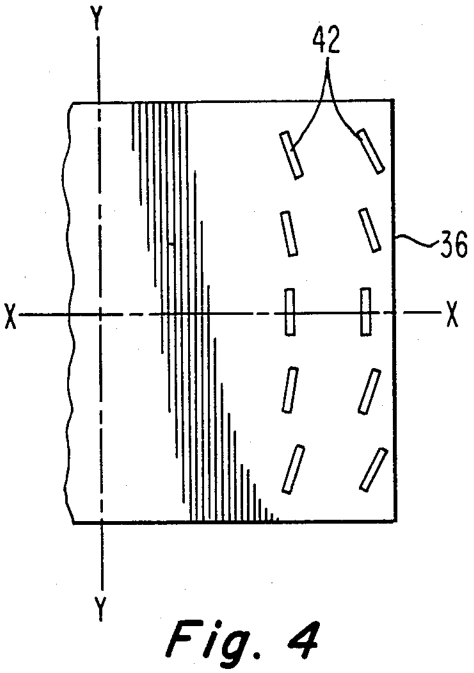
FIG. 4 is a plan view of a faceplate panel showing selected light source images projected thereon wherein a cylindrical lens is not used.

FIG. 1 shows an exposure device, known as a lighthouse 10, which is used for screening a color picture tube. The lighthouse 10 comprises a light box 12 and panel support 14 held in position by bolts (not shown) with respect to one another on a base 16 which in turn is supported at a desired angle by legs 18. A line light source 20 (typically a mercury arc lamp) is supported within the light box 12. An apertured plate 22 is positioned within the light box 12 above the line light source 20. An aperture 24 within the plate 22 defines the effective length of the line light source 20 that is used during exposure. Just above the aperture 24 is a tilt correction lens 26 which will be described in greater detail later. Within the panel support 14 is a main correction lens assembly 28. The lens assembly 28 comprises a misregister correction lens 30, which refracts the light from the light source into paths taken by the electron beams during tube operation, and a light intensity correction filter 32, which compensates for the variations in light intensity in various parts of the lighthouse. A faceplate panel assembly 34 is mounted on the panel support 14. The panel assembly 34 includes a faceplate panel 36 and a slit shadow mask 38 mounted within the panel 36 by known means. The inside surface of the faceplate panel 36 is coated with a photosensitive material 40. During screening, the photosensitive material 40 is exposed by light from the line light source 20 after it passes through the apertured plate 22, the tilt correction lens 26, the filter 32, the misregister correction lens 30 and the shadow mask 38.

FIGS. 2 and 3 show the line light source 20 and tilt correction lens 26 in greater detail. The lens 26 is generally cylindrically shaped being a solid piece of optical quartz that appears to be a cylinder sliced parallel to its central axis having a generally cylindrical convex surface and a flat surface. The line light source 20 is tubular in shape and may be of the mercury arc type, such as the BH6 lamp manufactured by General Electric. Within the lighthouse 10, the tilt correction lens 26 is oriented with its longitudinal axis A—A perpendicular to the longitudinal axis B—B of the line light source 20. As shown in FIG. 3, the apertured plate 22 is positioned between the light source 20 and the correction lens 26. Although it is possible to place the lens 26 against the plate 22 directly on the aperture 24, it is preferrable to space the lens 26 slightly above the aperture 24.

In an improvement of the foregoing screening method, both the faceplate panel 36 and the cylindrical tilt correction lens 26 are moved in synchronization in a direction Y—Y which is parallel to the longitudinal axis B—B of the line light source 20. As previously noted, movement of the faceplate panel 36 alone causes the image of the line light source 20 impinging thereon to move sideways slightly at the corners of the panel. This slight movement has been substantially eliminated by moving the cylindrical lens 26 in synchronization with the movement of the panel 36.

Figure 5:
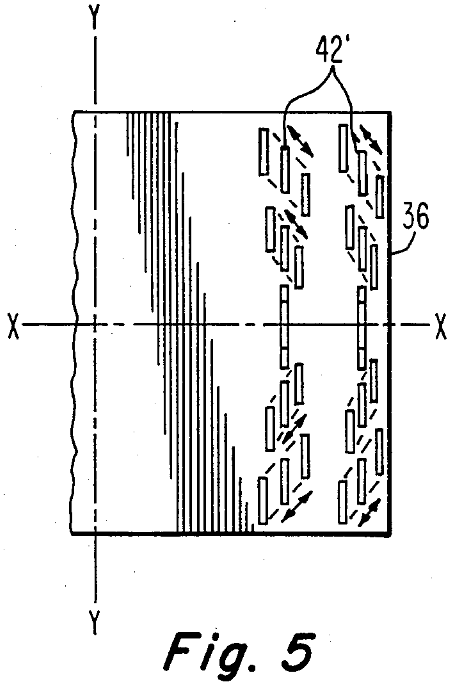
FIG. 5 is a plan view of a faceplate panel showing the movement of a light source image projected thereon when the panel, but not the cylindrical lens, is moved.
Figure 6:
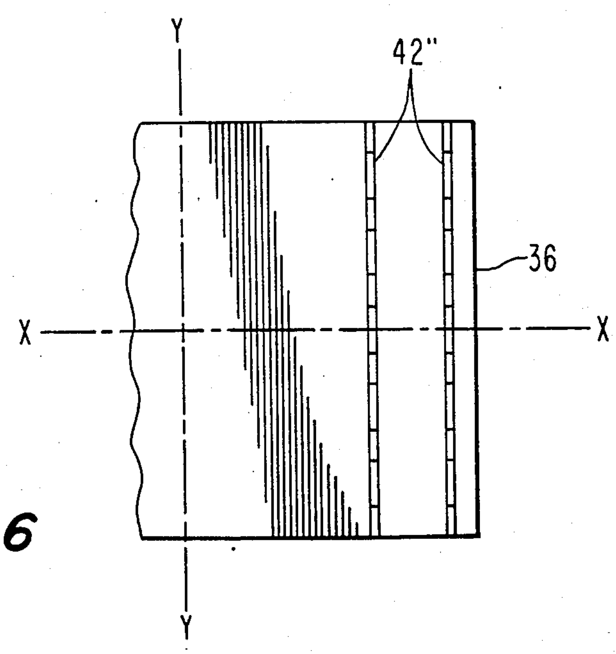
FIG. 6 is a plan view of a faceplate panel showing selected light source images projected thereon using a moving cylindrical correction lens.

The tilt correction provided by the foregoing method can be seen by comparing FIGS. 4 5, and 6. FIG. 4 shows the images 42 cast on a faceplate panel 36 of a line light source wherein no tilt correction lens is used. In this figure, the images off the major axis X—X and the minor axis Y—Y are tilted varying angles depending on their distances from both axes. For purposes of illustration, the image sizes and angle of tilt are greatly exaggerated in this drawing. FIG. 5 shows the movement of light source images 42 projected onto the faceplate panel 36 that is caused by movement of the panel. In FIG. 5, the tilt correction lens has straightened the light source images 42' so that they are oriented vertically and parallel the minor axis Y—Y of the panel. However, movement of the panel along the minor axis Y—Y results in a slight sideways movement of the light source image 42', as shown. Again, the motion shown is greatly exaggerated for illustrative purposes. FIG. 6 shows the resultant pattern formed by the light source images 42'' which are tilt corrected and projected through a moving tilt correction lens onto a moving faceplate panel. As can be seen, smooth straight screen lines are formed.

General Considerations

The upper surfaces of the lenses described herein are defined as being generally cylindrical. This definition recognizes that such surface can be either truly cylindrical in contour or that the surface can deviate to some extent from the geometric definition of cylindrical. Depending on the specific applications of the present novel method, such deviations may be necessary to fully compensate for light source image tilt in tubes having varying shadow mask contours, varying faceplate panel contours and varying mask-to-screen spacings.

It is preferred that the tilt correction lens used in the present method be an ultraviolet, UV, grade quartz selected for its solarization resistance. Transmission of the lens should exceed 90% after a 100 hour exposure to a 1KW mercury arc lamp positioned 10 mm from one side of the lens. Furthermore, the X or Y components of the slopes of the generally cylindrical surface of each lens should not deviate more than ±0.5 milliradians from the specified values. The planar surface of each lens should be flat to within 5 uniform fringes using a helium source. Both surfaces of each lens should be finished to an optical polish and clarity with no observable haze.

The following table gives dimensions for a specific circularly cylindrical convex lens of design similar to that of the lens 26 of FIGS. 2 and 3. The quality zone mentioned in the table is the effective area of the lens which is utilized during screening.

TABLE

| | |
|---|---|
| Overall Length | 2.500 inch (63.5 mm) |

TABLE-continued

| | |
|---|---|
| Overall Width | 2.000 inch (50.8 mm) |
| Radius of Curvature | 3.900 inch (99.1 mm) |
| Maximum Thickness | 0.300 inch (7.6 mm) |
| Length of quality zone | 1.800 inch (45.7 mm) |
| Width of quality zone | 1.800 inch (45.7 mm) |
| Distance from light source centerline to lens plano-surface | 0.500 inch (12.7 mm) |
| Distance from light source centerline to aperture plate | 0.280 inch (7.1 mm) |

The excursion distance of the faceplate panel 36 and the lens 26 during exposure is dependent on the vertical dimensions of the mask webs. In some instances, the excursion distance of the lens will be different than the excursion distance for the panel. However, for one tube having a 66 cm (26 V) diagonal, an excursion distance of ±5.53 mm (211 mils) was found to be near optimum for both the panel and lens.

What is claimed is:

1. In a method of screening a line screen slit mask color picture tube including coating a faceplate panel of said tube with a photosensitive material, inserting a slit shadow mask into said panel and exposing said photosensitive material by passing light from a line light source through the slits of said mask, positioning at least one generally cylindrical shaped lens between said line light source and said faceplate panel, during exposure of said photosensitive material, with the longitudinal axis of said lens perpendicular to the longitudinal axis of said line light source, the improvement comprising moving both said faceplate panel and said cylindrical, shaped lens in synchronization in a direction substantially parallel to the line light source during exposure of said photosensitive material.

* * * * *